United States Patent Office 2,933,517
Patented Apr. 19, 1960

2,933,517

NOVEL DIPHENOLIC ACID CO-AMIDES

Sylvan O. Greenlee, Racine, Wis., assignor to S. C. Johnson & Son, Inc., Racine, Wis.

No Drawing. Application December 3, 1956
Serial No. 625,584

8 Claims. (Cl. 260—404.5)

This invention relates to unique co-amides derived from aryloxy-substituted acids. More particularly this invention embraces the co-amides which constitute the reaction products of a bis(hydroxyaryl)alkylidene monocarboxylic acid and at least one modifying organic acid with a polyamine. The subject co-amides are of particular value in the manufacture of protective coatings, molding compositions, adhesives, etc.

In the preparation of insoluble, infusible, polymeric compositions, a major problem is to obtain a product which is sufficiently hard yet which retains the necessary flexibility and toughness. Polyepoxides have been receiving increased attention in the manufacture of these polymeric compositions mainly because of such characteristics as their reactivity with a large number of ingredients, such as the active hydrogen-containing compounds of sulfur, nitrogen, and oxygen, their small shrinkage, and their property of hardening usually without the evolution of volatiles. To these valuable fundamental properties can be added their practical convenience and the wide range of properties available by suitable choice of the type of epoxide. In the manufacture of polyepoxide compositions, one of the major problems encountered has continued to be the proper selection of a coreactant which will give the necessary conversion to infusibility and still remain flexible and tough.

In this invention a new and unique series of coreactants have been made available. The subject intermediates readily convert an epoxide and have, in addition, a means for imparting a plasticizer which is chemically linked by a primary bond, thus eliminating the possibility of plasticizer migration or volatilization. The new compositions comprise the reaction product of a novel organic acid, bis(hydroxyaryl)alkylidene monocarboxylic acid, and a modifying organic acid with a polyamine. An example of such a composition is the reaction product of 4,4-bis(4-hydroxyphenyl)pentanoic acid, linoleic acid, and ethylenediamine.

sary polyfunctionality for epoxide conversion is readily available. The active hydrogen of the phenolic hydroxyl groups, contributed by the Diphenolic Acid, will conveniently convert an epoxide as will be hydrogen attached to the nitrogen atom, provided a primary amine is employed. When a secondary amine is used, no available active hydrogen from the amine is present, except in instances where the polyamine is used in slight excess. Such a variation can be particularly valuable if additional conversion characteristics are desired. In addition to conversion characteristics, a means of plasticizing is available, if needed, through the proper selection of the modifying organic acid. The modifying organic acid can, in addition, be used to provide air-drying or heat-converting characteristics through the selection of an unsaturated acid. From this limited description, the versatility of these compositions is apparent. These properties, as well as other desirable characteristics, will become more apparent from the following more detailed description and the specific examples.

The hydroxyaryl-substituted alkylidene carboxylic acid contemplated for use herein should have two hydroxyaryl groups attached to a single carbon atom. The preparation of such an aryloxy acid is most conveniently carried out by condensing a keto acid with the desired phenol. Experience in the preparation of bisphenol and related compounds indicates that the carbonyl group of the keto-acid should be positioned next to a terminal methyl group in order to obtain satisfactory yields. Prior applications, Serial Nos. 464,607 and 489,300 (the latter of which is now abandoned), filed October 25, 1954, and February 18, 1955, respectively, disclose a number of illustrative compounds suitable for use as the Diphenolic Acid and methods of preparing the same. These materials, which are referred to for convenience as Diphenolic Acid or DPA, consist of the condensation products of levulinic acid and phenol, substituted phenols, or mixtures thereof. It is to be understood that the phenolic nuclei of the Diphenolic Acid may be substituted with any groups which will not interfere with the reactions contemplated herein. For example, the nuclei may be alkylated as disclosed in Serial No. 489,300 or they may be halogenated. The Diphenolic Acid derived from substituted phenols, such as the alkylated phenols, are sometimes more desirable than the products obtained from unsubstituted phenols since the alkyl groups provide better organic solvent solubility, flexibility, and water resistance. However, the unsubstituted product is usually more readily purified.

The polyamines which are operable in the co-amidification in this invention include the aliphatic or aromatic compounds, substituted with other functional groups or

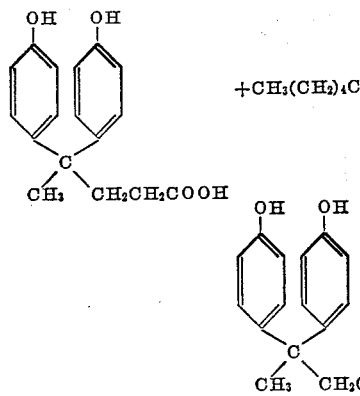

+CH₃(CH₂)₄CH=CH—CH₂—CH=CH(CH₂)₇CO₂H+NH₂CH₂CH₂NH₂ —heat→

OH  OH

CH₃   CH₂CH₂CONHCH₂CH₂NHCO—(CH₂)₇CH=CH—CH₂—CH=CH(CH₂)₄CH₃+2H₂O

It can be readily seen from the proposed structure and configuration of the above composition that the necessary unsubstituted. It is necessary that the amines used contain at least two primary or secondary amine groups.

The primary amines which will retain an active hydrogen atom attached to the nitrogen after reaction with the carboxyl group are particularly valuable in instances where additional conversion characteristics are needed. The substituted materials contemplated for use are those which do not contain functional groups which would interfere with the reactions of the Diphenolic Acid through its carboxyl group. For example, polyamines containing a carboxyl group such as diaminobenzoic acid would not be particularly well suited since the amidification of the Diphenolic Acid would be competing with the amidification of the benzoic acid carboxyl group. Amino ethers or hydroxylamines are examples of suitable substituted compounds. The aliphatic amines may be either low molecular weight or high molecular weight compounds. Illustrative low molecular weight polyamines are ethylenediamine, triethylenediamine, propylenediamine - 1,2 tetramethylenediamine, hexamethylenediamine, diethylenetriamine, and triethylenetetramine. These amines are conveniently prepared by the reaction of ammonia with alkyl halides or by reacting glycols with ammonia in the presence of a contact catalyst. The primary, secondary, and tertiary amines being conveniently separated by boiling point differences or by extraction. These low molecular weight aliphatic polyamines are usually obtained commercially as aqueous solutions and are conveniently used in this reaction as such, thus eliminating the necessity of stripping off water before use. The high molecular weight polyamines are usually prepared from polymerized fatty acids such as linseed oil fatty acid, or from the higher molecular weight glycols. The dimer acids of long chain fatty acids such as soyabean and linseed oil are probably the most important of the high molecular weight polyamines.

Aromatic polyamines are the mononuclear, nonfused polynuclear, and fused polynuclear polyamines. Many of the first two types may be described as phenylenediamines wherein two of the aromatic hydrogens are replaced by amino groups or organic radicals containing the same. Illustrative compounds are p-phenylenediamine, aminobenzylphenyleneamine, tri(p - aminophenyl)methane, and diaminodiphenylamine. Other nonfused compounds include those having more than two of the aromatic hydrogens replaced by amino groups or other radicals, e.g. toluene-2,4-diamine, 3,3'-bitolylene-4,4'-diamine. The characteristics of the final co-amides of this invention can be varied to a large extent by the selection of the polyamine to be used. For example, if a long chain polyamine is used, the resultant product would be more flexible than if a short chain or aromatic polyamine were used, or such an amine as ethylenediamine would give a less complex reaction product than would tetraethylenepentamine. Aromatic polyamines also usually give somewhat higher melting products than aliphatic polyamines. The number of amino groups present should be limited to about four since more than this number would probably result in highly complex products, thereby giving poor solvent solubility.

The modifying organic acids employed with the hydroxyaryl-substituted aliphatic acids in preparing the co-amides include a wide range of aliphatic or atomatic, resinous or nonresinous, short or long chain, saturated or unsaturated materials. The selection of the acid depends on the characteristics that it is desired to impart to the final polymeric product.

Self-plasticized compositions, which in addition have air-drying characteristics, may be prepared by employing as a modifying organic acid the drying-oil fatty acids. These acids normally contain from about 18 to 22 carbon atoms and are obtained by saponification of naturally occurring unsaturated vegetable oils. Other acids may be illustrated by the fish oil acids and the shorter chained unsaturated acid undecenoic acid, which is a decomposition product of castor oil acids. Low molecular weight unsaturated acids may also be used if only air-drying or heat-converting characteristics are desired since the plastication effect of the low molecular weight materials is insignificant. Examples of such acids are crotonic and sorbic acid.

The saturated monobasic aliphatic acids may also be used in the production of co-amides. Such acids offer a convenient means for regulating the plasticity of the resulting product. Examples of these acids are acetic, decanoic, and stearic acid. In general, the longer chain acids, having more than about 10 carbon atoms, are usually the most effective plasticizers. The long chain saturated acids may be obtained by saponification of the vegetable and fish oil acids, the unsaturated acids being first hydrogenated to remove the unsaturation. Longer chain saturated acids, containing from about 20 to more than 36 carbon atoms, may be obtained by the saponification of naturally occurring waxes or by chemical synthesis, using the so-called Oxo process.

Co-amides prepared from resinous acids are also advantageously employed in some instances. For example, rosin acids can be used in the preparation of polymeric products to impart hardness, gloss, and other resinous characteristics. Aromatic acids may also be used as valuable modifying organic acids and may be illustrated by such materials as benzoic acid butylbenzoic acid, phthalic acid, naphthoic acid, and phenoxyacetic acids. These acids are useful in imparting rigidity, hardness, and toughness to the polymeric products derived therefrom. The modifying acids used in the preparation of co-amides also include the dicarboxylic acids such as succinic, azelaic, sebacic, and longer chain acids such as the 36 carbon acids prepared by dimerizing unsaturated vegetable oil acids. In the preparation of the co-amides from the polyamines, hydroxyaryl-substituted acids, and modifying organic acids the reactants may be used in varying proportions of wide ranges.

The ratios of acid to polyamine may be adjusted so that substantially equivalent amounts of carboxyl and amino groups are present in the mixture. Such compositions have been found to be particularly valuable. It has further been observed that it may be desirable in some instances to use an excess of polyamine in order to obtain added conversion characteristics. For example, in a composition where the polyamine is diethylenetriamine, it may be desirable to react only one active hydrogen of each primary amino group, in this manner leaving free three active hydrogens attached to nitrogen atoms to aid in conversion. In other instances, it may be desirable to react substantially all of the amino groups allowing the conversion characteristics to be imparted by the phenolic hydroxyl groups of the Diphenolic Acid or through the unsaturation of the modifying acid.

Similarly, the ratio of hydroxyaryl-substituted acid to the modifying organic acid may be proportioned within relatively wide ranges. Good products can be obtained, for example, when the ratio of hydroxyaryl-substituted acid to modifying organic acid ranges from about 1:6 and 6:1. The particular ratio employed, of course, would depend upon the choice of acids used and the modifications desired in the reaction mixtures and polymeric materials prepared from the co-amides.

The co-amides of this invention are usually conveniently prepared by the methods of amidification well known in the art. In general, the co-amides described were prepared by heating the Diphenolic Acid and the modifying organic acid with a polyamine. In certain instances it may be desirable to use a simple ester of the desired acid depending usually on which material is most economically available. In instances where the polyamine is sufficiently high boiling so as not to volatilize during heat treatment, the co-amidification is conveniently realized by heating the polyamine with either the acid or its ester at temperatures up to about 225–250° C. In such reactions, the removal of water or alcohol formed during co-amidification is facilitated by azeotropic distillation with a hydrocarbon solvent or by passing a stream of inert gas over the reaction mixture. If a nonvolatile polyhydric alcohol is encountered, liberated through the reaction of a polyamine with an ester such as a glyceride, such an alcohol may be conveniently removed by a water-washing process.

The order of addition of the various ingredients, Diphenolic Acid, modifying organic acid, and polyamine to each other may be varied. It is sometimes advantageous to vary the order of reaction to obtain optimum results with a particular combination of ingredients used.

Examples I through XII, inclusive, describe the preparation of a selective group of co-amides. The proportions given are expressed as parts by weight unless otherwise indicated. Acid values represent the number of milligrams of KOH required to neutralize a 1-gram sample. Amine values represent the number of milligrams of HCl required to neutralize a 1-gram sample. The amine and acid values were determined by electrometric titration. Softening points were determined by Durrans' Mercury Method (Journal of Oil and Color Chemists' Association, 12, 173–175 [1929]).

*Example I*

A mixture of 143 parts of 4,4-bis(4-hydroxypheny)-pentanoic acid, 45 parts of ethylenediamine (85% amine and 15% water), and 140 parts of linseed oil fatty acids was heated at 100° C. for a period of 1 hour. The reflux condenser was changed in order to collect the distillate. The reaction mixture was heated at 104–110° C. for 35 minutes and gradually raised to 205° C. at which temperature it was held for an additional 15 minutes. The residual product, amounting to 281 parts, had an amine value of 26.8, an acid value of 30, and a softening point of 87° C.

*Example II*

A mixture of 572 parts of 4,4-bis(4-hydroxyphenyl)pentanoic acid and 173 parts ethylenediamine (69% ethylenediamine content) was heated at 100° C. for 4 hours. The condenser was changed in order to collect the distillate and the temperature gradually increased to 158° C. and held at this temperature for a period of 1 hour. At this point the product, amounting to 645 parts, had an amine value of 184. To this molten mixture was added 556 parts of oleic acid and the resulting mixture heated for a period of 1 hour at 135° C. The temperature was then gradually increased to 258° C. to give 1160 parts of a product having an amine value of 4.5, an acid value of 20, and a softening point of 70° C.

*Example III*

A mixture of 572 parts of 4,4-bis(4-hydroxyphenyl)pentanoic acid and 173 parts of ethylenediamine (69% ethylenediamine content) was heated at 100° C. for 4 hours. The condenser was changed in order to collect the distillate and the temperature gradually raised to 158° C. at which temperature it was held for 1 hour. This intermediate product, amounting to 645 parts and having an amine value of 184, was treated with 213 parts of Petrex Acid (a resinous terpene polycarboxylic acid having an acid value of 515–535, a softening point of 45–52° C., and marketed by the Hercules Powder Company). The reaction mixture was gradually heated to 235° C. and held at 235–250° C. for 15 minutes. The product, amounting to 203 parts, had an amine value of 31.7, an acid value of 0, and a softening point of 122° C.

*Example IV*

A mixture of 178 parts of p-tert-butylbenzoic acid and 87 parts of ethylenediamine (69%) was heated at 115–120° C. for a period of 1 hour, after which 286 parts of 4,4-bis(4-hydroxyphenyl)pentanoic acid were added and the temperature held at 120° C. for a period of 1 hour. After changing the condenser in order to collect the distillate, the temperature was gradually raised to 230° C. and at 230–245° C. for a period of 1 hour. The residual product, amounting to 482 parts, had an amine value of 30.7, an acid value of 17.8, and a softening point of 135° C.

*Example V*

A mixture of 86 parts of crotonic acid and 87 parts of ethylenediamine (69%) was heated at 130° C. for a period of 1 hour, after which 286 parts of 4,4-bis(4-hydroxyphenyl)pentanoic acid were added and the reaction mixture then heated for 40 minutes at 120° C. The condenser was changed in order to collect the distillate and the temperature was raised to 230° C. over a period of 40 minutes. The residual product, amounting to 387 parts, had an amine value of 22.2, an acid value of 0, and a softening point of 141° C.

*Example VI*

A mixture of 143 parts of 4,4-bis(4-hydroxyphenyl) pentanoic acid and 87 parts of propylenediamine (85%) was heated to 130° C. over a period of 35 minutes after which 140 parts of linseed oil fatty acids were added. After heating for 25 minutes at 125–130° C., the condenser was changed in order to collect the distillate and the temperature raised to 210° C. and held at 210–225° C. for 1½ hours. The pressure in the reaction vessel was reduced to 20 mm. and the heating continued for 25 minutes at 225–270° C. The residual product, amounting to 247 parts, had an acid value of 0, an amine value of 24, and a softening point of 66° C.

*Example VII*

A mixture of 143 parts of 4,4-bis(4-hydroxyphenyl) pentanoic acid and 87 parts of propylenediamine (85%) was heated to 130° C. over a period of 35 minutes, after which 142 parts of oleic acid were added. The reaction mixture was held at 130° C. for 25 minutes. The condenser was changed in order to collect the distillate, after which the temperature was gradually raised to 190° C. and held at 190–220° C. for 1¾ hours. The pressure was reduced to 20 mm. and the reaction mixture heated for an additional 25 minutes at 220–268° C. The residual product, amounting to 283 parts, had an amine value of 17.8, an acid value of 1.6, and a softening point of 72° C.

*Example VIII*

A mixture of 143 parts of 4,4-bis(4-hydroxyphenyl) pentanoic acid and 83 parts of hexamethylenediamine (70%) was heated to 120° C. and held at 120–130° C. for 2¼ hours, after which 140 parts of soyabean oil fatty acids were added. The condenser was changed in order to collect the distillate and the reaction mixture gradually heated to 210° C. over a period of 15 minutes. The reaction mixture was held at 210–235° C. for a period of 1 hour. After reducing the pressure to approximately 20 mm., heating was continued for a period of 1 hour at 230–237° C. The residual product, amounting to 318 parts, had an amine value of 18, an acid value of 0, and a softening point of 80° C.

*Example IX*

A mixture of 143 parts of 4,4-bis(4-hydroxyphenyl) pentanoic acid and 44 parts of ethylenediamine (69%) was heated for a period of 1 hour at 116–130° C., after which 170 parts of rosin were added. The reaction mixture was heated for a period of 30 minutes at 122° C. and the condenser changed in order to collect the distillate. The temperature was then raised to 230° C. over a period of 30 minutes, after which the pressure was reduced to 20 mm. and heating continued at 230–245° C. for a period of 4 hours. The residual product, amounting to 275 parts, had an acid value of 10, an amine value of 0, and a softening point of 134° C.

Example X

A mixture of 258 parts of 4,4-bis(4-hydroxyphenyl)pentanoic acid and 73 parts of triethylenetetramine was charged to a reaction flask and heated to 130° C. and the temperature increased to 200° C. over a period of 4½ hours, after which 30 parts of oleic acid were added and the reaction continued an additional 13 hours at 180–190° C. The residual product, amounting to 300 parts had an acid value of 0, an amine value of 88.7, and a softening point of 95° C.

Example XI

A mixture of 31 parts of 4,4-bis(4-hydroxy-3-methylphenyl)pentanoic acid, 254 parts of soya fatty acids and 54 parts para-phenylenediamine was charged to a reaction flask and heated to 190° C. and held at this temperature for a period of 13½ hours. The resulting product, amounting to 292 parts, had an acid value of 0, an amine value of 1, and a softening point of 141° C.

Example XII

A mixture of 86 parts of 4,4-bis(4-hydroxyphenyl)pentanoic acid, 214 parts rapeseed acid, and 99 parts p,p'-methylenedianiline was charged to a reaction flask and heated to a temperature of 180° C. and held between 180–185° C. for a period of 12 hours. The resultant product, amounting to 350 parts, had an acid value of 0, an amine value of 2, and a softening point of 101.5° C.

The utility of the instant co-amides in coreaction with a polyepoxide can be illustrated by their reaction with a simple aliphatic polyepoxide prepared as illustrated in Example XIII.

Example XIII

In a 3-neck flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide, dissolved in diethyl phthalate to a 60% content, was added. The temperature was held at 160–165° C. for a period of 8 hours, adding one part of the methyl ethyl ketone peroxide solution each 5 minutes during this 8 hour period. After the reaction mixture had stood overnight, the volatile ingredients were removed by vacuum distillation. The distillation was started at 19 mm. pressure and a pot temperature of 26° C. and a volatile material finally removed at a pressure of 3 mm. and a pot temperature of 50° C. The residual product had a molecular weight of 418 and equivalent weight to epoxide content of 198, the yield amounting to 250 parts.

The following examples demonstrate the preparation of insoluble, infusible films from the instant co-amides and the polyepoxide of Example XIII. Portions of the co-amides and Example XIII were separately dissolved in methyl ethyl ketone to a nonvolatile content of 50%.

Example XIV 10 parts of Example XIII and 12.9 parts of Example IV were admixed to give a compatible solution. A film of .002" wet thickness was prepared from said admixture and converted at 175° C. for 30 minutes to give a tack-free, very tough, flexible film which withstood boiling water for 5½ hours and 5% aqueous sodium hydroxide at 25° C. for 29½ hours without showing signs of deterioration.

Example XV 10 parts of Example XIII and 15.2 parts of Example III were admixed to give a compatible solution. A film of .002" wet thickness was prepared from said admixture and converted at 175° C. for 30 minutes to give a tack-free, very tough, flexible film which withstood boiling water for 10 hours and 5% aqueous sodium hydroxide at 25° C. for 2 hours without showing signs of deterioration.

Example XVI 10 parts of Example XIII and 14.9 parts of Example VII were admixed to give a compatible solution. A film of .002" wet thickness was prepared from said admixture and converted at 175° C. for 30 minutes to give a tack-free, very tough, flexible film which withstood boiling water for 5 hours and 5% aqueous sodium hydroxide at 25° C. for 18 hours without showing signs of deterioration.

Example XVII 10 parts of Example XIII and 16.9 parts of Example IX were admixed to give a compatible solution. A film of .002" wet thickness was prepared from said admixture and converted at 175° C. for 30 minutes to give a tack-free, very tough, flexible film which withstood boiling water for 5½ hours and 5% aqueous sodium hydroxide at 25° C. for 24 hours without showing signs of deterioration.

It should be appreciated that while there are above disclosed but a limited number of embodiments of this invention, it is possible to produce still other embodiments without departing from the inventive concept herein disclosed.

It is claimed and desired to secure by Letters Patent:

1. As a composition of matter the mixed polyamide of (A) a pentanoic acid consisting essentially of 4,4-bis(4-hydroxyaryl)pentanoic acid wherein the hydroxyaryl radical is a hydroxyphenyl radical and is free from substituents other than alkyl groups of from 1 to 5 carbon atoms, (B) an additional carboxylic acid containing no more than two carboxyl groups, said carboxyl groups being the sole amide forming groups and (C) a polyamine having only the elements carbon, hydrogen and nitrogen and containing from 2–4 amino groups each having at least one amino hydrogen, the hydrogen atoms of said amino groups being the sole amide forming groups.

2. A new composition of matter as described in claim 1 wherein the polyamine is an aliphatic polyamine.

3. A new composition of matter as described in claim 1 wherein the polyamine is an aromatic polyamine.

4. A new composition of matter as described in claim 1 wherein the modifying organic acid is an olefinically unsaturated monocarboxylic acid having from about 18 to 22 carbon atoms.

5. A new composition of matter as described in claim 1 wherein the modifying organic acid is a saturated monocarboxylic acid having from about 10 to 36 carbon atoms.

6. A new composition of matter as described in claim 1 wherein the modifying organic acid is a dicarboxylic acid.

7. A new composition of matter as described in claim 1 wherein the modifying organic acid is an aromatic organic acid.

8. A new composition of matter as described in claim 1 wherein the modifying organic acid is a resinous organic acid.

References Cited in the file of this patent

UNITED STATES PATENTS

| | | |
|---|---|---|
| 2,132,388 | Berchet | Oct. 11, 1938 |
| 2,279,745 | Stevenson | Apr. 14, 1942 |
| 2,322,240 | Kropa | June 22, 1943 |

OTHER REFERENCES

Bader: J. American Chemical Society, volume 76, pages 4465–4466 (1954).

UNITED STATES PATENT OFFICE

CERTIFICATE OF CORRECTION

Patent No. 2,933,517 April 19, 1960

Sylvan O. Greenlee

It is hereby certified that error appears in the above numbered patent requiring correction and that the said Letters Patent should read as corrected below.

In the heading to the printed specification, line 2, title of invention, for "NOVEL DIPHENOLIC ACID CO-AMIDES" read -- NOVEL CO-AMIDES OF PHENOL-KETO ACID ADDUCTS --; column 2, line 4, for "be" read -- the --; column 4, line 2, for "plastication" read -- plasticization --; column 6, line 2, after "and" insert -- held --.

Signed and sealed this 25th day of October 1960.

(SEAL)
Attest:

KARL H. AXLINE
Attesting Officer

ROBERT C. WATSON
Commissioner of Patents